(12) United States Patent  
Edogawa et al.

(10) Patent No.: US 7,176,785 B2  
(45) Date of Patent: Feb. 13, 2007

(54) DEVICE CONTROL SYSTEM

(75) Inventors: Kazuya Edogawa, Saitama (JP); Hiroshi Sugita, Saitama (JP); Kenichi Sonobe, Saitama (JP); Hirota Takahashi, Saitama (JP); Tsutomu Hoshino, Saitama (JP); Tomokazu Kaneko, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/280,087

(22) Filed: Oct. 25, 2002

(65) Prior Publication Data

US 2003/0088318 A1 May 8, 2003

(30) Foreign Application Priority Data

Oct. 25, 2001 (JP) .......................... P2001-327450

(51) Int. Cl.  
*G08B 9/00* (2006.01)

(52) U.S. Cl. .............. 340/286.02; 340/7.32; 340/10.33; 340/310.11; 340/310.16

(58) Field of Classification Search ......... 340/286.01, 340/286.02, 310.01, 425.2, 7.33, 7.32, 10.31, 340/10.33, 10.34, 310.06, 310.11–310.18  
See application file for complete search history.

(56) References Cited

U.S. PATENT DOCUMENTS

| | | | | |
|---|---|---|---|---|
| 4,665,544 A | * | 5/1987 | Honda et al. | 379/102.03 |
| 4,703,306 A | * | 10/1987 | Barritt | 340/310.08 |
| 5,142,683 A | * | 8/1992 | Burkhardt et al. | 709/215 |
| 5,237,305 A | * | 8/1993 | Ishikuro et al. | 340/286.01 |
| 5,600,310 A | * | 2/1997 | Whipple et al. | 340/3.51 |
| 5,839,111 A | * | 11/1998 | Muraoka et al. | 704/275 |
| 6,061,604 A | * | 5/2000 | Russ et al. | 700/90 |
| 6,141,706 A | * | 10/2000 | Thornton et al. | 710/21 |
| 6,381,700 B1 | * | 4/2002 | Yoshida | 713/201 |
| 6,404,741 B1 | * | 6/2002 | Buhler et al. | 370/244 |
| 6,408,058 B1 | * | 6/2002 | Lanet | 379/93.19 |
| 6,493,824 B1 | * | 12/2002 | Novoa et al. | 713/162 |
| 6,549,130 B1 | * | 4/2003 | Joao | 307/10.2 |
| 6,564,056 B1 | * | 5/2003 | Fitzgerald | 340/5.1 |
| 6,654,890 B1 | * | 11/2003 | Girard | 713/200 |
| 6,707,565 B2 | * | 3/2004 | Ohira et al. | 358/1.15 |

* cited by examiner

*Primary Examiner*—Brent A. Swarthout  
(74) *Attorney, Agent, or Firm*—Morgan, Lewis and Bockius, LLP

(57) ABSTRACT

While a general-purpose interface circuit and another general-purpose interface circuit are provided so as to transmit/receive data between a host appliance and a device appliance, when the general-purpose interface of the device appliance happens to hang up, a control section transmits a reset signal via a dedicated interface circuit. When a dedicated interface circuit provided on the side of the device appliance receives this reset signal and then outputs this received reset signal to the general-purpose interface circuit, the general-purpose interface circuit is reinitiated.

8 Claims, 1 Drawing Sheet

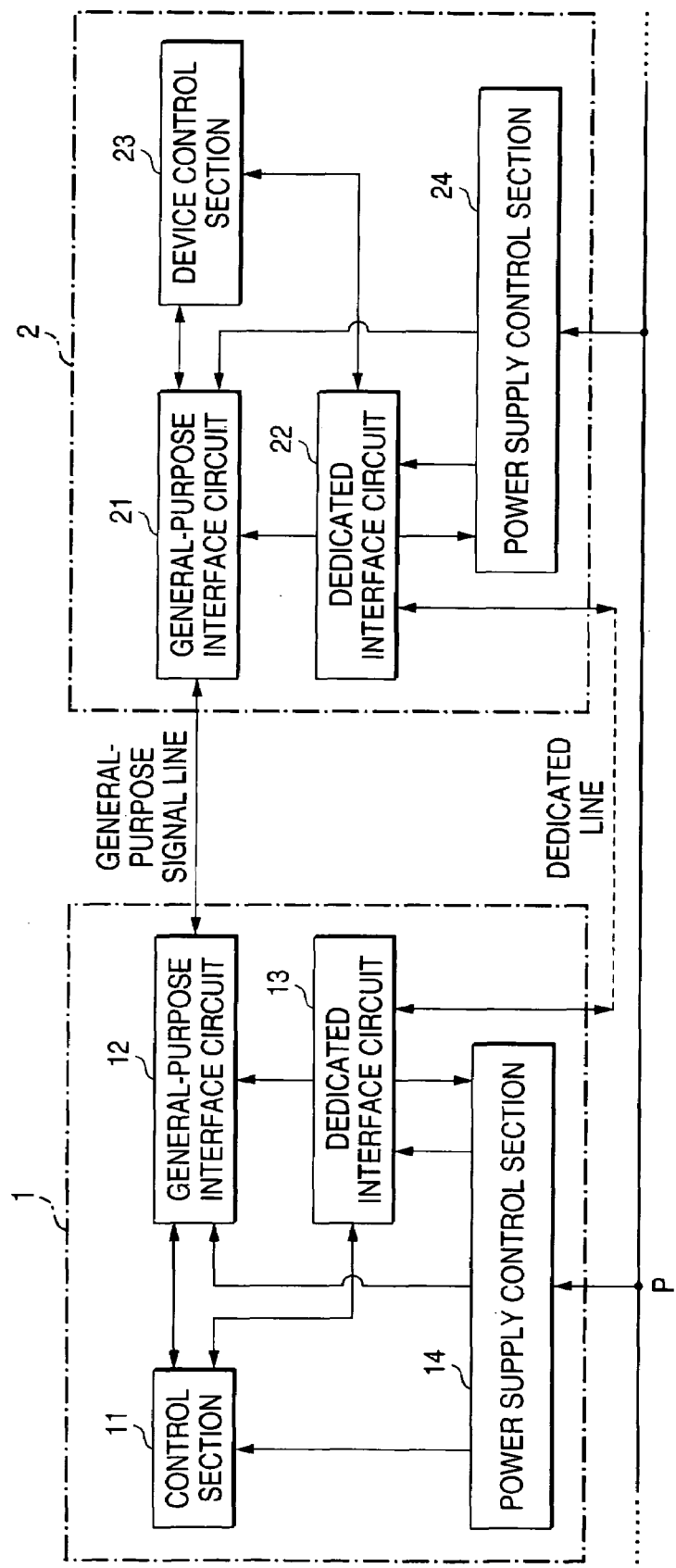
FIGURE

DEVICE CONTROL SYSTEM

The present disclosure relates to the subject matter contained in Japanese Patent Application No. 2001-327450 filed on Oct. 25, 2001, which is incorporated herein by reference in its entirety.

BACKGROUND OF THE INVENTION

1. Field of the Invention

The present invention is related to a device control system for controlling a device appliance by transmitting/receiving a signal between a host appliance and the device appliance.

2. Description of the Related Art

Recently, there are many cases that the USB (Universal Serial Bus) standard has been employed as serial interfaces utilized in data communications and so on. This USB standard is employed so as to transmit/receive communication data between, for instance, a personal computer and a modem. Also, for example, in the case that a FAX apparatus (facsimile machine) functioning as a built-in type device appliance which is built in a copy machine is connected to a control apparatus of the copy machine functioning as a host appliance, this USB standard may be sometimes used.

In an electronic appliance employing a USB interfaces, in the case that the USB interface happens to hang up, a power supply of this USB interface is interrupted (cut out) and thereafter is again turned ON so as to reinitiate the USB interface, so that the entire electronic appliance is recovered. However, in accordance with this reinitiating method, for example, in the case that a built-in type appliance is used, while there is a certain possibility that a device appliance and a host appliance commonly use a power supply unit, a power supply for driving the device appliance and a power supply for driving the host appliance must be cut out all together in order to reinitiate a USB interface employed in such a built-in type appliance.

Also, when the power supply of the USB interface is cut out, since a communication from the host appliance to the device appliance cannot be performed, the power supply of the USB interface must be maintained under ON state even while the device appliance is controlled in a power saving mode and thus a power supply of a partial circuit portion thereof is cut out. As a result, a power saving efficiency becomes lower.

As previously described, in the conventional device control system, the recovery operation for such a case that the USB interface happens to hang up becomes cumbersome and the utility thereof is low. For instance, in the case that a built-in type electronic appliance employs such a USB interface, when a power supply is cut out, there are some possibilities that a power supply of an entire system must be interrupted, resulting in low utility. Also, since the supply of electric power to the USB interface cannot be stopped in order to accept the communications even while the device appliance is controlled in the power saving mode, the power saving efficiency becomes low.

SUMMARY OF THE INVENTION

The present invention has been made to solve the above-described problems of the conventional device control system, and therefore, has an object to provide a device control system capable of recovering a hung-up condition of a USB interface by executing a simple control operation, while employing a simple circuit, and also capable of improving a power saving efficiency.

To solve the above-described problems of the related art, a device control system according to the present invention including a host appliance having a general-purpose interface, a device appliance having a general-purpose interface, and a dedicated line connected to the host appliance and the device appliance. The host appliance and the device appliance are mutually connected to each other via the general-purpose interfaces to transmit/receive data via the general-purpose interfaces. The dedicated line transmits at least one of a reset signal and a wake-up signal.

Also, in order to solve the above-described problems of the related art, a device control system according to the present invention has a host appliance and device appliance. The host appliance has a general-purpose interface circuit for transmitting/receiving data via a general-purpose signal line to/from the device appliance and a dedicated interface circuit for transmitting/receiving at least one of a reset signal and a wake-up signal-as a control signal to/from the device appliance. The device appliance has a general-purpose interface circuit for transmitting/receiving data via the general-purpose signal line to/from the host appliance and a dedicated interface circuit for transmitting/receiving the control signal to/from the host appliance. In this case, the above-described dedicated interface circuit may preferably transmit/receive the signal via a power supply line.

Also, in order to solve the above-described problems of the related art, a device appliance according to the present invention, connected via a general-purpose signal line to a host appliance, the device appliance has a general-purpose interface circuit for transmitting/receiving data via the general-purpose signal line to/from the host appliance and a dedicated interface circuit for transmitting/receiving a control signal via a dedicated line to/from the host appliance.

In this case, it is preferable that the device appliance is subject to a control of an power supply state in order to be brought into a power saving state under a predetermined condition and that a supply of electric power to the general-purpose interface circuit is stopped based on the control. Also, it is preferable that when a predetermined wake-up signal is received from the host appliance by the dedicated interface circuit while the device appliance is set under power saving state, the device appliance notifies the reception of the wake-up signal to a control source of the power supply state to restart the supply of the electric power to the general-purpose interface circuit.

Furthermore, it is preferable that when a requirement of transmitting data to the host appliance is made, the device appliance transmits a wake-up signal via the dedicated interface circuit to the host appliance. Also, it is preferable that while the host appliance is subject to a control of a power supply state in order to be brought into a power saving state under a predetermined condition and a supply of electric power to the general-purpose interface circuit is stopped based on the control to bring the host appliance into the power saving state, when a predetermined wake-up signal is received from the device appliance by the dedicated interface circuit, the host appliance notifies the reception of the wake-up signal to a control source of the power supply state to restart the supply of the electric power to the general-purpose interface circuit.

Also, in order to solve the above-described problems of the related art, a host appliance according to the present invention, connected via a general-purpose signal line to a device appliance, the host appliance has a general-purpose interface circuit for transmitting/receiving data via the general-purpose signal line to/from the device appliance and a dedicated interface circuit for transmitting/receiving a control signal via a dedicated line to/from the device appliance.

In this case, it is preferable that while the host appliance is subject to a control of a power supply state in order to be brought into a power saving state under a predetermined condition and a supply of electric power to the general-purpose interface circuit is stopped based on the control to bring the host appliance into the power saving state, when a predetermined wake-up signal is received from the device appliance by the dedicated interface circuit, the host appliance notifies the reception of the wake-up signal to a control source of the power supply state to restart the supply of the electric power to the general-purpose interface circuit.

Also, it is preferable that while the host appliance is subject to a control of a power supply state in order to be brought into a power saving state under a predetermined condition and a supply of electric power to the general-purpose interface circuit is stopped based on the control to bring the host appliance into the power saving state, when a requirement of transmitting data to the device appliance is made, the host appliance transmits a wake-up signal via the dedicated interface circuit to the device appliance. Furthermore, it is preferable that when the host appliance detects that an error occurs between a general-purpose interface circuit of the device appliance and the host appliance, the host appliance transmits a reset signal via the dedicated interface circuit to the device appliance.

BRIEF DESCRIPTION OF THE DRAWINGS

FIG. 1 is a block diagram for indicating an arrangement of a device control system according to an embodiment of the present invention.

DETAILED DESCRIPTION OF THE PREFERRED EMBODIMENTS

Referring now to drawings, an embodiment of the present invention will be described. As indicated in FIG. 1, a device control system according to an embodiment of the present invention includes a host appliance 1 and a device appliance 2. Electric power is supplied via a power supply line "P" to these appliances 1 and 2. The host appliance 1 contains a control section 11, a general-purpose interface circuit 12, a dedicated (exclusively-used) interface circuit 13, and a power supply control section 14. Also, the device appliance 2 contains a general-purpose interface circuit 21, a dedicated (exclusively-used) interface circuit 22, a device control section 23, and a power supply control section 24. In this case, both the power supply control section 14 of the host appliance 1 and the power supply control section 24 of the device appliance 2 correspond to a unit for performing a power supply control of the invention.

The control section 11 of the host appliance 1 transmits a control instruction signal via the general-purpose interface circuit 12 with respect to the device appliance 2 so as to control the device appliance 2. Also, this control section 11 transmits a reset signal via the dedicated interface circuit 13 in order to restart (reset) the general-purpose interface circuit 21 of the device appliance 2. Furthermore, this control section 11 transmits a wake-up signal via the dedicated interface circuit 13 with respect to the device appliance 2 when a supply of electric power to the general-purpose interface circuit 21 of the device appliance 2 is stopped.

The general-purpose interface circuit 12 corresponds to, for example, a USB (Universal Serial Bus) interface, and is driven by electric power supplied from the power supply control section 14. The general-purpose interface circuit 12 transfers a signal entered from the control section 11 via a general-purpose signal line (USB cable) to the device appliance 2.

The dedicated interface circuit 13 transfers either a reset signal or a wake-up signal via a dedicated (exclusively-used) line in accordance with an instruction entered from the control section 11. Also, when this dedicated interface unit 13 receives a wake-up signal from the device appliance 2, the dedicated interface unit 13 outputs a signal, which makes the power supply control section 14 turn on the power supply, to the power supply control section 14.

In the device control system according to this embodiment, the dedicated line used to transfer the reset signal from this dedicated interface circuit 13 may also constitute the power supply line "P." It should be noted that since a method for transmitting a predetermined signal via the power supply line P has been widely known, a detailed explanation thereof is omitted.

Also, in this case, the dedicated line may constitute the power supply line P. Alternatively, the dedicated interface 13 of the host appliance 1 is connected to the dedicated interface 2 of the device appliance 2 by employing another signal line and this signal line may be utilized as such a "dedicated line." In this alternative case, it is preferable that a general-purpose cable maybe utilized as this dedicated line. For example, such a same cable as the power supply line "P" may be preferably utilized.

The power supply control section 14 corresponds to a control source under power supply condition of the present invention and transfers electric power of the power supply via the power supply line "P" to the respective sections of the device control system. Also, the power supply control section 14 monitors operations of the host appliance 1, and stops the supply of the electric power with respect to the control section 11 and the general-purpose interface circuit 12 in the case that the monitored operation condition is made coincident with a sleep condition which has been previously determined. Furthermore, when a signal for causing the power supply to be turned ON is entered from the dedicated interface 13 to the power supply control section 14 while the supply of the electric power is stopped (namely during power saving condition), this power supply control section 14 restarts to supply the electric power with respect to the general-purpose interface circuit 12.

The general-purpose interface circuit 21 of the device appliance 2 is connected via a predetermined signal line to the general-purpose interface circuit 12 of the host appliance 1 so as to transmit/receive a signal to/from the general-purpose interface circuit 12 of the host appliance 1. Also, this general-purpose interface circuit 21 of the device appliance 2 is connected to the dedicated interface circuit 22, and is restarted by receiving a reset signal from the dedicated interface circuit 22.

The dedicated interface circuit 22 is connected via the dedicated line to the host appliance 1, and outputs the reset signal which is received via this dedicated line to the general-purpose interface circuit 21. Also, when this dedicated interface circuit 22 receives the wake-up signal via the dedicated line, the dedicated interface circuit 22 outputs such a signal to the power supply control section 24 which corresponds to a control source under power supply condition so as to notify that the power supply control section 24 is required to turn ON the power supply.

The device control section 23 is operated by receiving electric power supplied from the power supply control section 24. This device control section 23 is connected to the general-purpose interface circuit 21, and is operated as the device in response to the control signal which is received by the general-purpose interface circuit 21. For example, in such a case that the device appliance 2 corresponds to a FAX (facsimile) machine, this device control section 23 corresponds to a FAX module which transmits/receives a FAX signal via a telephone line network (not shown). A featured operation of this embodiment is such that this device control section 23 performs the below-mentioned operations. That is to say, while the supply of the electric power to the general-purpose interface 12 provided on the side of the host appliance 1 is stopped, when such a requirement of transmitting data to the host appliance 1 is made, this device control section 23 transmits the wake-up signal via the dedicated interface 22 to the host appliance 1.

The power supply control section 24 controls the supplies of the electric power to the respective sections in response to the operation condition of the device control section 23. Concretely speaking, when predetermined time has elapsed after the device control section 23 is brought into such a waiting condition that the device control section 23 waits for an instruction, this power supply control section 24 controls the respective sections to be brought into power saving conditions, and also stops the supply of the electric power with respect to both the device control section 23 and the general-purpose interface circuit 21.

Also, while the power supply control section 24 is set under this power saving condition control operation, if this power supply control section 24 receives the signal for causing the power supply to be turned ON from the dedicated interface circuit 22, then this power supply control section 24 releases the power saving condition, and also restarts the supply of the electric power with respect to the general-purpose interface circuit 21.

Next, operations of the device control system according to this embodiment will now be explained by considering such an example that a FAX module functioning as a device appliance is built in a copy machine functioning as a host appliance.

In this case, the host appliance further contains a scanner section, an image processing section, and a printer section. This host appliance may function as a copy machine in such a manner that for instance, a predetermined image processing operation is carried out in the image processing section with respect to image data read by the scanner section, and the image-processed image data is outputted to the printer section. Also, the image data processed by the image processing section is transmitted not to the printer section, but transmitted via the general-purpose interface unit 12 to the device appliance 2 corresponding to the FAX module under control of the control section 11, and then this image data is received by the general-purpose interface 21 of the device appliance 2 to be outputted to the device control section 23. This device control section 23 transmits this image data in a FAX mode.

Now, if the general-purpose interface 21 happens to hang up due to some reason, then transmission/reception operations of the image data cannot be carried out, and thus, an error occurs on the side of the host appliance 1, so that the control section 11 notifies this error to a user. When the control section 11 of the host appliance 1 detects this error (otherwise, control unit receives instruction issued from user), this control section 11 transmits a reset signal via the dedicated interface circuit 13.

As a result, this reset signal is transferred via the dedicated line to the dedicated interface circuit 22 of the device appliance 2, and then, the dedicated interface circuit 22 outputs this reset signal to the general-purpose interface circuit 21. As a consequence, the general-purpose interface circuit 21 is restarted, so that the signal can be newly transmitted/received.

On the other hand, in such a case that transmission/reception operations of the FAX machine are not carried out over a predetermined time period, the power supply control section 24 stops the supply of the electric power with respect to both the general-purpose interface circuit 21 and the device control section 23 so as to bring both the general-purpose interface circuit 21 and the device control section 23 into the power saving condition. When an instruction of the FAX transmission is issued during this power saving condition, since the power supply of the general purpose interface circuit 21 is cut out, the signal from the host appliance 1 cannot be received by the general-purpose interface circuit 21, resulting in an error state. As a consequence, the control section 11 of the host appliance 1 transmits a wake-up signal via the dedicated interface circuit 13.

As a result, this wake-up signal is transferred via the dedicated line to the dedicated interface circuit 22 of the device appliance 2. Then, the dedicated interface circuit 22 outputs a signal, which causes the power supply to be turned ON, to the power supply control section 24 in response to this wake-up signal. In response to this signal, the power supply control section 24 restarts the supply of the electric power with respect to both the general-purpose interface circuit 21 and the device control section 23, so that the transmission/reception operations of the data from the host appliance 1 can be carried out and the FAX transmission operation can be executed.

On the other hand, while the power control unit 14 provided on the side of the host appliance 1 stops the supply of the electric power to both the control section 11 and the general-purpose interface circuit 12 in accordance with an operation condition (for example, copying operation is not carried out for predetermined time period, or more) of the host appliance 1, when a FAX signal is received on the side of the device appliance 2 corresponding to the FAX module, since the electric power is not supplied to the general-purpose interface unit 12, the received image data cannot be transferred by the general-purpose interface circuit 21.

As previously explained, when the requirement of transmitting the data is made, the device control section 23 transmits a wake-up signal via the dedicated interface circuit 22 to the host appliance 1. The host appliance 1 receives this wake-up signal by the dedicated interface circuit 13, and then, the dedicated interface circuit 13 outputs a signal with respect to the power supply control section 14 so as to notify that the power supply must be turned ON. As a result, the power control unit 14 restarts to supply the electric power with respect to both the general-purpose interface 12 and the control unit 11, so that the FAX image data received by the device appliance 2 can be transmitted to the host appliance 1.

It should be understood that when the general-purpose interface circuit 12 provided on the side of the host appliance 1 happens to hang up, the device control section 23 may transmit a reset signal via the dedicated interface circuit 22 to the host appliance 1, and the dedicated interface circuit 13 may output the reset signal to the general-purpose interface circuit 12 so as to restart the general-purpose interface circuit 12.

Also, the USB interface has been employed as the general-purpose interface in the above explanations. Alternatively, this general-purpose interface may be realized by employing any types of general-purpose data interfaces, for instance, not only the USB interface, but also data interfaces such as IEEE 1394 recommendation, serial data interfaces, and parallel data interfaces.

Furthermore, in the device control system of this embodiment, the host appliance 1 is provided with the power supply control section 14, and also the device appliance 2 is equipped with the power supply control section 24. Alternatively, the power supply control unit corresponding to the control source under power supply condition may be installed in any one of the host appliance 1 and the device appliance 2. For example, in such a case that only the power control unit 14 is provided with the host appliance 1, this power control unit 14 may also have the function of the power control unit 24 employed in the device appliance 2. In addition, a power control unit may be arranged as an independent apparatus with respect to both the host appliance 1 and the device appliance 2.

In accordance with the present invention, in the device control system which contains the host appliance and the device appliance connected via the general-purpose interface circuit to the host appliance so as to transmit/receive the data via this general-purpose interface circuit, the dedicated line for transmitting/receiving at least one of the reset signal and the wake-up signal is provided between the host appliance and the device appliance. As a consequence, while the device control system employs the simple circuit, the hung-up state of the USB interface circuit can be recovered under simple control manner, and the power saving efficiency can be improved.

What is claimed is:

1. A device control system comprising:
   a host appliance having a general-purpose interface;
   a device appliance having a general-purpose interface; and
   a dedicated line connected to the host appliance and the device appliance,
   wherein the host appliance and the device appliance are mutually connected to each other via the general-purpose interfaces to transmit/receive data via the general-purpose interfaces;
   wherein the host appliance transmits/receives at least one of a reset signal and a wake-up signal via the dedicated line;
   wherein the general-purpose interface of the host appliance and the general-purpose interface of the device appliance are connected via a general-purpose signal line; and
   wherein the general-purpose signal line is disposed separately from the dedicated line.

2. A device control system comprising:
   a host appliance; and
   a device appliance,
   wherein the host appliance comprises:
      a general-purpose interface circuit for transmitting/receiving data via a general-purpose signal line to/from the device appliance; and
      a dedicated interface circuit for transmitting/receiving at least one of a reset signal and a wake-up signal as a control signal to/from the device appliance; and
   wherein the device appliance comprises:
      a general-purpose interface circuit for transmitting/receiving data via the general-purpose signal line to/from the host appliance; and
      a dedicated interface circuit for transmitting/receiving the control signal via a dedicated line to/from the host appliance; and
      the dedicated line is disposed separately from the general-purpose signal line.

3. The device control system according to claim 2, further comprising a power supply line for supplying electric power therethrough, wherein the dedicate interface circuits transmit/receive the control signal via the power supply line.

4. A device control system comprising:
   a host appliance having a general-purpose interface;
   a device appliance having a general-purpose interface; and
   a dedicated line connected to the host appliance and the device appliance,
   wherein the host appliance and the device appliance are mutually connected to each other via the general-purpose interfaces to transmit/receive data via the general-purpose interfaces;
   wherein the host appliance transmits/receives at least one of a reset signal and a wake-up signal via the dedicated line, the reset signal restarting and recovering the general-purpose interface in a hung-up state, the wake-up signal restarting a supply of an electric power to the general-purpose interface in a power saving state;
   wherein the general-purpose interface of the host appliance and the general-purpose interface of the device appliance are connected via a general-purpose signal line; and
   wherein the general-purpose signal line is disposed separately from the dedicated line.

5. A device control system comprising:
   a host appliance; and
   a device appliance,
   wherein the host appliance has a general-purpose interface circuit for transmitting/receiving data via a general-purpose signal line to/from the device appliance;
   wherein the device appliance has a general-purpose interface circuit for transmitting/receiving data via the general-purpose signal line to/from the host appliance;
   wherein the host appliance has a dedicated interface circuit for transmitting/receiving via a dedicated line as a control signal at least one of a first reset signal and a first wake-up signal, the first reset signal restarting and recovering the general-purpose interface of the device appliance in a hung-up state, the first wake-up signal restarting a supply of an electric power to the general-purpose interface of the device appliance in a power saving state;
   wherein the device appliance has a dedicated interface circuit for transmitting/receiving via the dedicated line as a control signal at least one of a second reset signal and a second wake-up signal, the second reset signal restarting and recovering the general-purpose interface of the host appliance in a hung-up state, the second wake-up signal restarting a supply of an electric power to the general-purpose interface of the host appliance in a power saving state; and
   wherein the dedicated line is disposed separately from the general-purpose signal line.

6. A device control system, comprising:
   a host appliance; and
   a device appliance,
   the host appliance further comprising:
   a general-purpose interface circuit that transmits/receives data via a general-purpose signal line to/from the device appliance;
   a dedicated interface circuit that transmits/receives at least one of a reset signal and a wake-up signal as a control signal to/from the device appliance; and a power supply control unit that controls a power supply in the host appliance, the device appliance further comprising:

a general-purpose interface circuit that transmits/receives data via the general-purpose signal line to/from the host appliance;

a dedicated interface circuit that transmits/receives the control signal via a dedicated line to/from the host appliance; and a power supply control unit that controls a power supply in the device appliance, and wherein the dedicated line is disposed separately from the general-purpose signal line, and the power supply control unit of the host appliance and the power supply control unit of the device appliance are connected with a power supply line.

7. The device control system according to claim 6, wherein the dedicated line constitutes the power supply line.

8. A device control system, comprising:

a host appliance;

a device appliance;

a power supply control unit that controls a power supply to the host appliance and the device appliance, the host appliance further comprising:

a general-purpose interface circuit that transmits/receives data via a general-purpose signal line to/from the device appliance; and a dedicated interface circuit that transmits/receives at least one of a reset signal and a wake-up signal as a control signal to/from the device appliance, the device appliance further comprising:

a general-purpose interface circuit that transmits/receives data via the general-purpose signal line to/from the host appliance; and a dedicated interface circuit that transmits/receives the control signal via a dedicated line to/from the host appliance, and wherein the dedicated line is disposed separately from the general-purpose signal line.

\* \* \* \* \*